United States Patent
Jiang et al.

(10) Patent No.: US 10,318,069 B2
(45) Date of Patent: Jun. 11, 2019

(54) METHOD FOR CONTROLLING STATE OF TOUCH SCREEN, AND ELECTRONIC DEVICE AND MEDIUM FOR IMPLEMENTING THE SAME

(71) Applicant: Beijing Xiaomi Mobile Software Co., Ltd., Beijing (CN)

(72) Inventors: Zhongsheng Jiang, Beijing (CN); Dawei Xiong, Beijing (CN); Dan Liu, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/340,999

(22) Filed: Nov. 2, 2016

(65) Prior Publication Data

US 2017/0344184 A1    Nov. 30, 2017

(30) Foreign Application Priority Data

May 24, 2016 (CN) .......................... 2016 1 0350384

(51) Int. Cl.
G06F 3/044 (2006.01)
G06F 3/041 (2006.01)
G06F 3/046 (2006.01)

(52) U.S. Cl.
CPC .......... G06F 3/0418 (2013.01); G06F 3/046 (2013.01); G06F 3/0416 (2013.01); G06F 2203/04108 (2013.01)

(58) Field of Classification Search
CPC ....................................................... G06F 3/36
See application file for complete search history.

(56) References Cited

U.S. PATENT DOCUMENTS

| 2006/0267953 | A1* | 11/2006 | Peterson, Jr. ......... G06F 3/0418 345/173 |
| 2015/0109218 | A1* | 4/2015 | Satou ................... G06F 3/0488 345/173 |
| 2015/0153951 | A1* | 6/2015 | Kim ..................... G06F 3/0414 715/773 |
| 2016/0110027 | A1  | 4/2016 | Westerman |

FOREIGN PATENT DOCUMENTS

| CN | 103631502 A | 3/2014 |
| CN | 104541231 A | 4/2015 |
| CN | 104866227 A | 8/2015 |
| CN | 105353901 A | 2/2016 |

OTHER PUBLICATIONS

Extended European Search Report of EP16196037.2.
International Search Report of PCT/CN2016/095645.

* cited by examiner

*Primary Examiner* — Sanghyuk Park
(74) *Attorney, Agent, or Firm* — Jun He Law Offices P.C.; James J. Zhu

(57) ABSTRACT

A method, an electronic device, and a medium for controlling a state of a touch screen are provided. The method includes: detecting whether the touch screen is in a first preset state; determining whether induction information of a suspended object reaches a first set of preset thresholds, if the touch screen is not in the first preset state; and controlling the touch screen to be switched from a current state to the first preset state, if the induction information reaches the first set of preset thresholds.

7 Claims, 5 Drawing Sheets

METHOD FOR CONTROLLING STATE OF TOUCH SCREEN, AND ELECTRONIC DEVICE AND MEDIUM FOR IMPLEMENTING THE SAME

CROSS-REFERENCE TO RELATED APPLICATIONS

This application is based on and claims priority to Chinese Patent Application Serial No. 201610350384.9, filed with the State Intellectual Property Office of P. R. China on May 24, 2016, the entire content of which is incorporated herein by reference.

FIELD

The present disclosure relates to a terminal technology field, and more particularly to a method, an electronic device, and a medium for controlling a state of a touch screen.

BACKGROUND

Typically, a mistake touch is avoided by sensing a distance by a proximity sensor of a touch screen. When a smart phone is placed in a pocket or bag, the proximity sensor may contact with a surface of the pocket or bag and trigger a corresponding anti-mistaken touch function, which makes the smart phone unstable when realizing the anti-mistaken touch function.

SUMMARY

According to embodiments of a first aspect of the present disclosure, a method for controlling a state of a touch screen is provided. The method includes: detecting whether the touch screen is in a first preset state; determining whether induction information of a suspended object reaches a first set of preset thresholds, if the touch screen is not in the first preset state; and controlling the touch screen to be switched from a current state to the first preset state, if the induction information reaches the first set of preset thresholds.

According to embodiments of a third aspect of the present disclosure, an electronic device is provided, and the electronic device includes: a processor; and a memory, configured to store instructions executable by the processor, and the processor is configured to: detect whether a touch screen is in a first preset state; determine whether induction information of a suspended object reaches a first set of preset thresholds, if the touch screen is not in the first preset state; and control the touch screen to be switched from a current state to the first preset state, if the induction information reaches the first set of preset thresholds.

According to embodiments of a third aspect of the present disclosure, a non-transitory computer-readable storage medium having stored therein instructions that, when executed by a processor of a terminal device, causes the terminal device to perform a method for controlling a state of a touch screen, and the method comprises: detecting whether the touch screen is in a first preset state; determining whether induction information of a suspended object reaches a first set of preset thresholds, if the touch screen is not in the first preset state; and controlling the touch screen to be switched from a current state to the first preset state, if the induction information reaches the first set of preset thresholds.

It should be understood that, the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

Figure 1A:
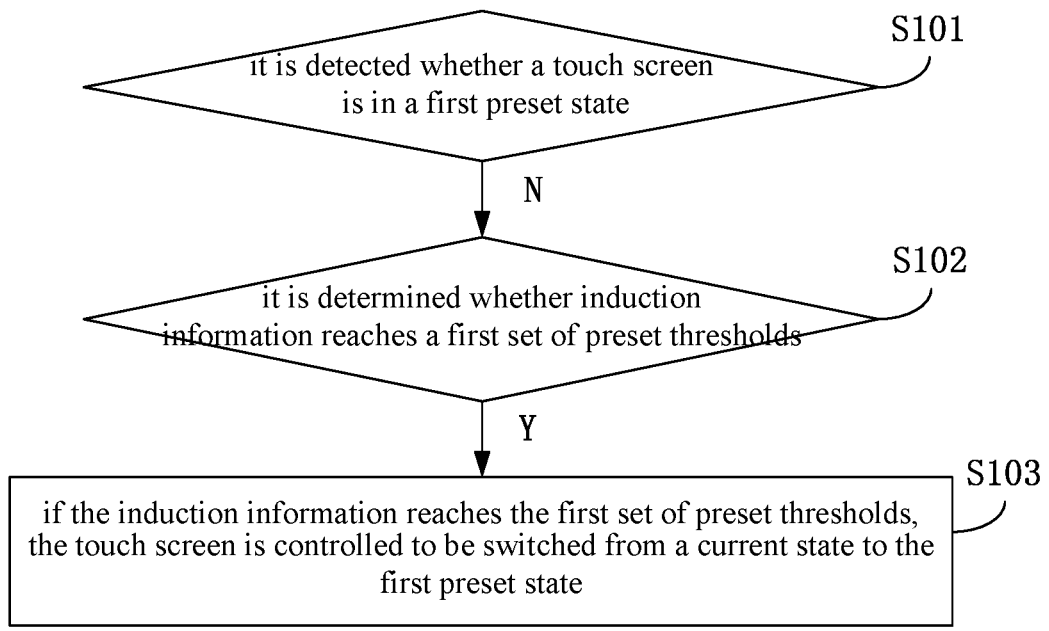
FIG. 1A is a flow chart of a method for controlling a state of a touch screen according to an example embodiment.
Figure 1B:
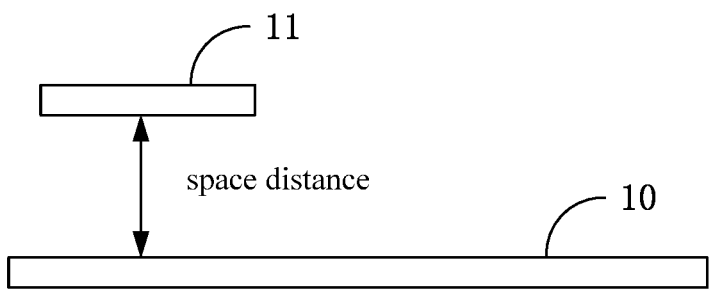
FIG. 1B is a schematic diagram showing a scene in which a method for controlling a state of a touch screen is implemented according to an example embodiment.

FIG. 1A is a flow chart of a method for controlling a state of a touch screen according to an example embodiment. FIG. 1B is a schematic diagram showing a scene in which a method for controlling a state of a touch screen is implemented according to an example embodiment. The method for controlling a state of a touch screen may be applied in an electronic device (for example, device with a touch function, such as smart phone, tablet computer etc.). As shown in FIG. 1A, the method includes steps S101-S103 as follow.

In step 101, it is detected whether a touch screen is in a first preset state. If the touch screen is not in the first preset state, step S102 is executed; if the touch screen is in the first preset state, a method process in an embodiment shown in FIG. 3 may be executed, which is not described in detail herein.

In step S102, if the touch screen is not in the first preset state, it is determined whether induction information of a suspended object reaches a first set of preset thresholds. If the induction information reaches the first set of preset thresholds, step S103 is executed; if the induction information does not reach the first set of preset thresholds, it is continued to monitor the induction information.

In step S103, if the induction information reaches the first set of preset thresholds, the touch screen is controlled to be switched from a current state to the first preset state.

In the above step S101, the first preset state may be a screen-off state of the touch screen. It may be detected whether the touch screen is in the screen-off state by an operating system of the electronic device. The electronic device may control the touch screen to enter in the screen-off state under an anti-mistaken touch mode.

In the above step S102, the induction information of the suspended object may include an induction area between the suspended object and the touch screen induced by the touch screen and a strength of an induction signal of the suspended object on the touch screen induced by a proximity sensor. The larger the contact surface between the suspended object and the touch screen is, the larger the induction area is. The smaller the distance between the suspended object and the touch screen is, the greater the strength of the induction signal is.

In the above step S103, the first set of preset thresholds may include a first preset threshold corresponding to the induction area and a second preset threshold corresponding to the strength of the induction signal.

In an example scenario, a screen-off state is taken as an example of the first preset state. As shown in FIG. 1B, when a user holds the electronic device to make a call, the suspended object 11 (here, the face of user) is within a small range away from the touch screen 10, and the suspended object 11 suspends on the touch screen 10 of the electronic device. Thus, the touch screen 10 may sense the induction area of the suspended object 11 on the touch screen 10 and a proximity sensor of the electronic device may detect the strength of the induction signal of the suspended object on the touch screen 10. If the induction area reaches the corresponding preset threshold and the strength of the induction signal reaches the corresponding preset threshold, the touch screen 10 is controlled to be switched from the current screen-on state to the screen-off state, thus preventing the user from mistakenly touching the touch screen during the call and ensuring that the touch screen stays in the first preset state.

In this embodiment, when the touch screen is not in the first preset state and the induction information of the suspended object reaches the first set of preset thresholds, the touch screen is controlled to be switched from the current state to the first preset state, such that the touch screen may still stay in the first preset state when the induction information changes within a range which is greater than the first set of preset thresholds due to a shaking of the electronic device by a user, thus ensuring the stability of the electronic device in the first preset state and improving the user's experience.

In an embodiment, the first set of preset thresholds includes a first preset threshold and a second preset threshold; the induction information includes an induction area of the suspended object on the touch screen induced by the touch screen and a strength of an induction signal of the suspended object on the touch screen induced by a proximity sensor; and determining whether induction information of a suspended object reaches the first set of preset thresholds includes: determining whether the induction area reaches the first preset threshold and determining whether the strength of the induction signal reaches the second preset threshold; determining that the induction information of the proximity sensor reaches the first set of preset thresholds, if the induction area reaches the first preset threshold and/or the strength of the induction signal reaches the second preset threshold; and determining that the induction information of the proximity sensor does not reach the first set of preset thresholds, if the induction area does not reach the first preset threshold and the strength of the induction signal does not reach the second preset threshold.

In an embodiment, the method further includes: determining whether the induction information reaches a second set of preset thresholds, if the touch screen is in the first preset state; controlling the touch screen to be switched from the first preset state to a second preset state, if the induction information does not reach the second set of preset thresholds; and controlling the touch screen to stay in the first preset state, if the induction information reaches the second set of preset thresholds.

In an embodiment, the second set of preset thresholds includes a third preset threshold and a fourth preset threshold; the induction information includes an induction area of the suspended object on the touch screen induced by the touch screen and a strength of an induction signal of the suspended object on the touch screen induced by a proximity sensor; and determining whether the induction information reaches a second set of preset thresholds includes: determining whether the induction area reaches the third preset threshold and determining whether the strength of the induction signal reaches the fourth preset threshold; determining that the induction information of the proximity sensor reaches the second set of preset thresholds, if the induction area reaches the third preset threshold and/or the strength of the induction signal reaches the fourth preset threshold; and determining that the induction information of the proximity sensor does not reach the second set of preset thresholds, if the induction area does not reach the third preset threshold and the strength of the induction signal does not reach the fourth preset threshold.

In an embodiment, the first preset state is a screen-off state, and the second preset state is a screen-on state.

Concerning how to control the state of the touch screen, reference will be made to the following embodiments.

The above method provided in embodiments of the present disclosure may enable the touch screen to stay in the first preset state when the induction information changes within a range which is greater than the first set of preset thresholds due to a shaking of the electronic device by a user, thus ensuring the stability of the electronic device in the first preset state.

Figure 2:
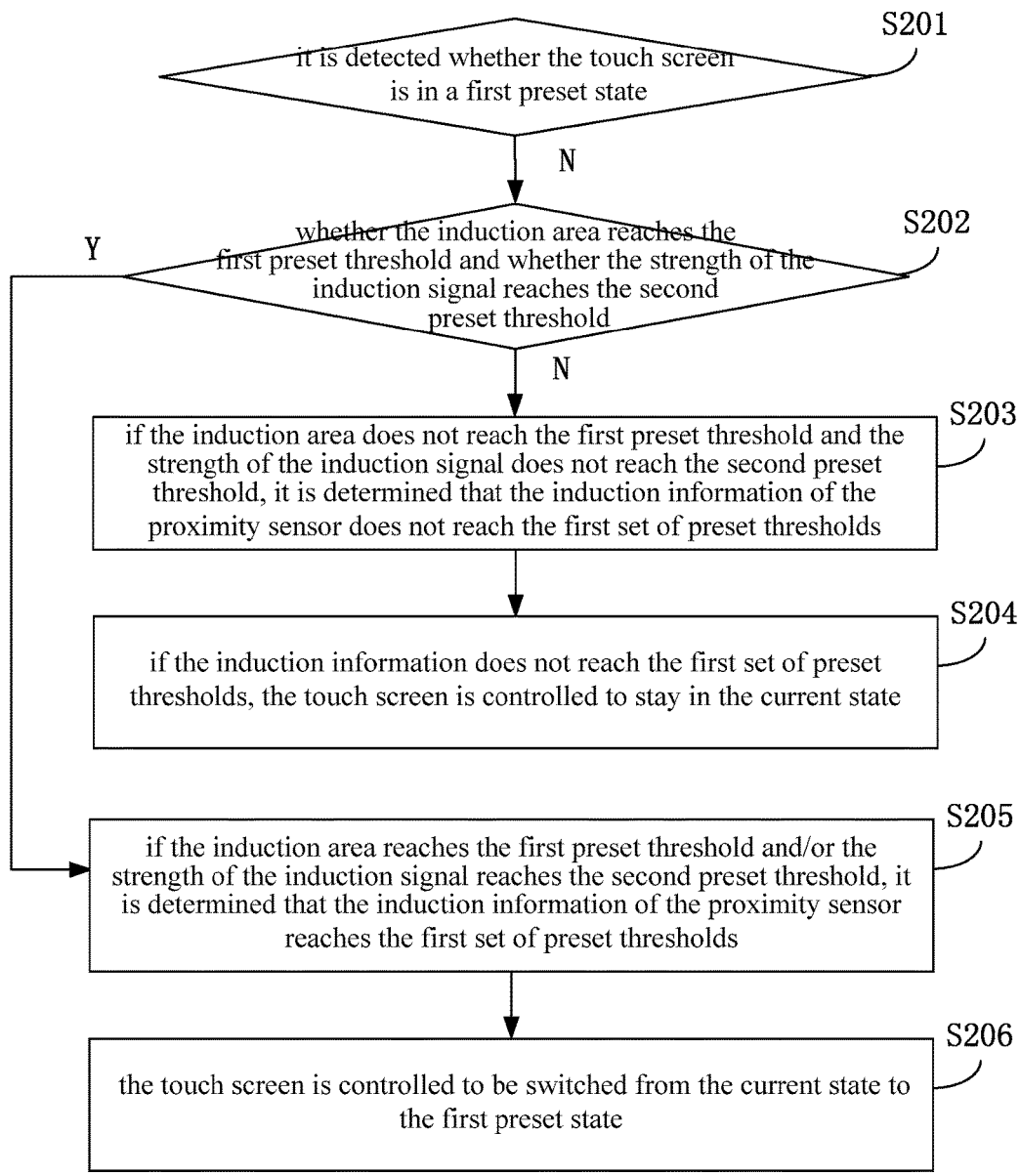
FIG. 2 is a flow chart of a method for controlling a state of a touch screen according to an example embodiment.

FIG. 2 is a flow chart of a method for controlling a state of a touch screen according to an example embodiment. In this embodiment, the first set of preset thresholds includes, for example, a first preset threshold and a second preset threshold. The induction information includes an induction area of the suspended object on the touch screen induced by the touch screen and a strength of an induction signal of the suspended object on the touch screen induced by a proximity sensor. As shown in FIG. 2, the method includes following steps.

In step S201, it is detected whether the touch screen is in a first preset state. If the touch screen is not in the first preset state, step S202 is executed; if the touch screen is in the first preset state, the method process in an embodiment shown in FIG. 3 may be executed to detect the state of the touch screen.

In step S202, if the touch screen is not in the first preset state, it is determined whether the induction area reaches the first preset threshold and whether the strength of the induction signal reaches the second preset threshold. If the induction area does not reach the first preset threshold and the strength of the induction signal does not reach the second preset threshold, step S203 is executed; if the induction area reaches the first preset threshold and/or the strength of the induction signal reaches the second preset threshold, step S205 is executed.

In step S203, if the induction area does not reach the first preset threshold and the strength of the induction signal does not reach the second preset threshold, it is determined that the induction information of the proximity sensor does not reach the first set of preset thresholds.

In step S204, if the induction information does not reach the first set of preset thresholds, the touch screen is controlled to stay in the current state.

In step S205, if the induction area reaches the first preset threshold and/or the strength of the induction signal reaches the second preset threshold, it is determined that the induction information of the proximity sensor reaches the first set of preset thresholds.

In step S206, the touch screen is controlled to be switched from the current state to a first preset state.

Concerning descriptions of the above steps S201, S203 and S204, reference may be made to the related descriptions of embodiment shown in FIG. 1A, which is not described herein again.

In the above step S202, concerning the related descriptions of the strength of induction signal of the suspended object induced by the proximity sensor and the induction area of the suspended object on the touch screen, reference may be made to the related art, which is not described herein. In an embodiment, the first preset threshold and the second preset threshold may be set according to the sensitivity of the proximity sensor and touch screen. The specific values of the first preset threshold and the second preset threshold are not limited herein.

In this embodiment, the touch screen is controlled to be in the first preset state by means of the first set of preset thresholds, and the touch screen stays in the first preset state when the induction area induced by the touch screen and the strength of the induction signal induced by the proximity sensor change in a range which is greater than the first set of preset thresholds, such that the continuously switching of the touch screen between the first preset state and the second preset state may be avoided, and the stability of the touch screen in the first preset state may be ensured.

Figure 3:
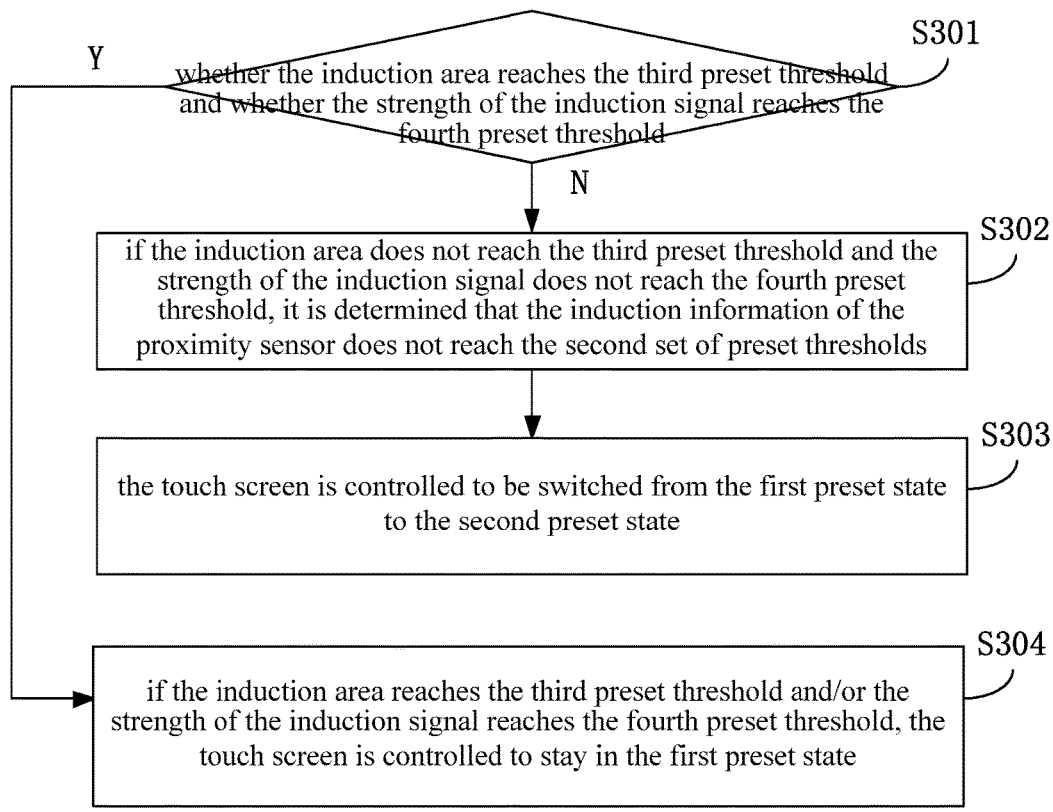
FIG. 3 is a flow chart of a method for controlling a state of a touch screen according to another example embodiment.

FIG. 3 is a flow chart of a method for controlling a state of a touch screen according to another example embodiment. In this embodiment, an exemplary description is made based on the above method provided in embodiments of the present disclosure, and an exemplary illustration of how the first set of preset thresholds is switched to the second set of preset thresholds when the touch screen is in the first preset state is provided. The second set of preset thresholds include a third preset threshold and a fourth preset threshold, and the induction information includes an induction area of the suspended object on the touch screen induced by the touch screen and a strength of an induction signal of the suspended object on the touch screen induced by a proximity sensor. As shown in FIG. 3, the method includes following steps.

In step S301, if the touch screen is in the first preset state, it is determined whether the induction area reaches the third preset threshold and whether the strength of the induction signal reaches the fourth preset threshold. If the induction area dose not reach the third preset threshold and the strength of the induction signal dose not reach the fourth preset threshold, step S302 is executed; if the induction area reaches the third preset threshold and/or the strength of the induction signal reaches the fourth preset threshold, step S304 is executed.

In step S302, if the induction area does not reach the third preset threshold and the strength of the induction signal does not reach the fourth preset threshold, it is determined that the induction information of the proximity sensor does not reach the second set of preset thresholds.

In step S303, the touch screen is controlled to be switched from the first preset state to the second preset state.

In step S304, if the induction area reaches the third preset threshold and/or the strength of the induction signal reaches the fourth preset threshold, the touch screen is controlled to stay in the first preset state.

In the above step S301, in an embodiment, the third preset threshold may be less than the first preset threshold, and the fourth preset threshold may be less than the second preset threshold. In addition, the third preset threshold and the fourth preset threshold may be set according to the sensitivity of the proximity sensor and touch screen. The specific values of the third preset threshold and the fourth preset threshold are not limited herein.

In an example scenario, the screen-off state is taken as an example of the first preset state and the screen-on state is taken as an example of the second preset state. When a user holds the electronic device to make a call, the suspended object 11 is within a small range away from the touch screen 10, and the suspended object 11 (here, the face of user) suspends on the touch screen 10 of the electronic device. Thus, the touch screen 10 may sense the induction area of the suspended object 11 on the touch screen 10 and a proximity sensor of the electronic device may detect the strength of the induction signal of the suspended object on the touch screen 10. If the induction area reaches the first preset threshold and the strength of the induction signal reaches the second preset threshold, the touch screen enters into the screen-off state. If the user adjusts the posture of the electronic device continually during holding the electronic device, the induction area of the touch screen may be decreased or the strength of the induction signal may be reduced. If the induction area does not reach the first preset threshold and the strength of the induction signal does not reach the second preset threshold, the touch screen is switched from the screen-off state to the screen-on state, which will cause the continuously switching of the touch screen between the blank screen and the bright screen. In this embodiment, in order to avoid this situation, it is determined whether the induction area reaches the third preset threshold which is less than the first preset threshold and whether the strength of the induction signal reaches the fourth preset threshold which is less than the second preset threshold, such that the touch screen is controlled to stay in the screen-off state.

In this embodiment, if the touch screen is in the first preset state, the induction area is compared with the relatively small third preset threshold and the strength of the induction signal is compared with the relatively small fourth preset threshold. When the induction area is decreased or the strength of the induction signal is reduced because the user adjusts the posture of holding the electronic device continually during holding the electronic device, the touch screen may still stay in the first preset state, such that the stability of the touch screen in the first preset state is ensured.

Figure 4:
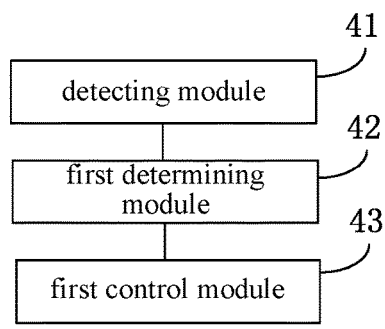
FIG. 4 is a block diagram of a device for controlling a state of a touch screen according to an example embodiment.

FIG. 4 is a block diagram of a device for controlling a state of a touch screen according to an example embodiment. As shown in FIG. 4, the device for controlling a state of a touch screen includes a detecting module 41, a first determining module 42 and a first control module 43.

The detecting module 41 is configured to detect whether a touch screen is in a first preset state.

The first determining module 42 is configured to determine whether induction information of a suspended object reaches a first set of preset thresholds, if the detecting module 41 detects that the touch screen is not in the first preset state.

The first control module 43 is configured to control the touch screen to be switched from a current state to the first preset state, if the first determining module 42 determines that the induction information reaches the first set of preset thresholds.

Figure 5:
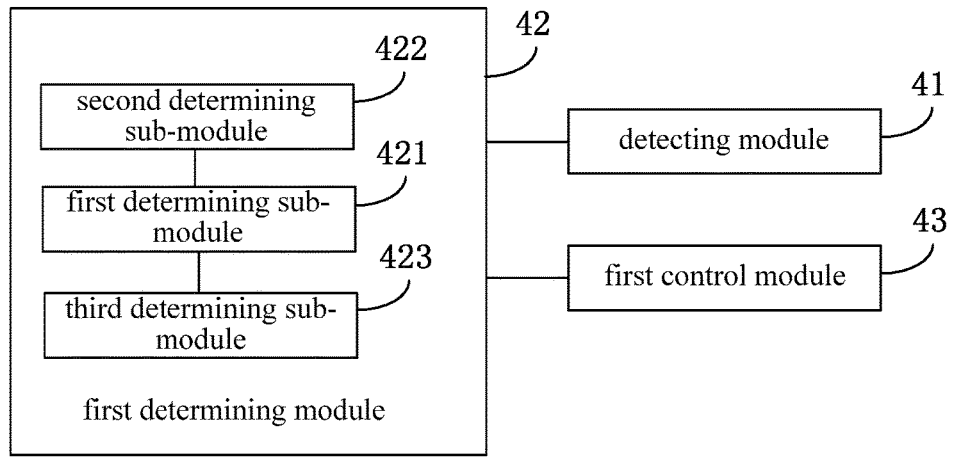
FIG. 5 is a block diagram of another device for controlling a state of a touch screen according to an example embodiment.

FIG. 5 is a block diagram of another device for controlling a state of a touch screen according to an example embodiment. As shown in FIG. 5, based on the above embodiment shown in FIG. 4, in an embodiment, the first set of preset thresholds includes a first preset threshold and a second preset threshold, the induction information includes an induction area of the suspended object on the touch screen induced by the touch screen and a strength of an induction signal of the suspended object on the touch screen induced by a proximity sensor, and the first determining module 42 may include a first determining sub-module 421, a second determining sub-module 422, and a third determining sub-module 423.

The first determining sub-module 421 is configured to determine whether the induction area reaches the first preset threshold and to determine whether the strength of the induction signal reaches the second preset threshold.

The second determining sub-module 422 is configured to determine that the induction information of the proximity sensor reaches the first set of preset thresholds, if the first determining sub-module 421 determines that the induction area reaches the first preset threshold and/or the strength of the induction signal reaches the second preset threshold.

The third determining sub-module 423 is configured to determine that the induction information of the proximity sensor does not reach the first set of preset thresholds, if the first determining sub-module 421 determines that the induction area does not reach the first preset threshold and the strength of the induction signal does not reach the second preset threshold.

Figure 6:
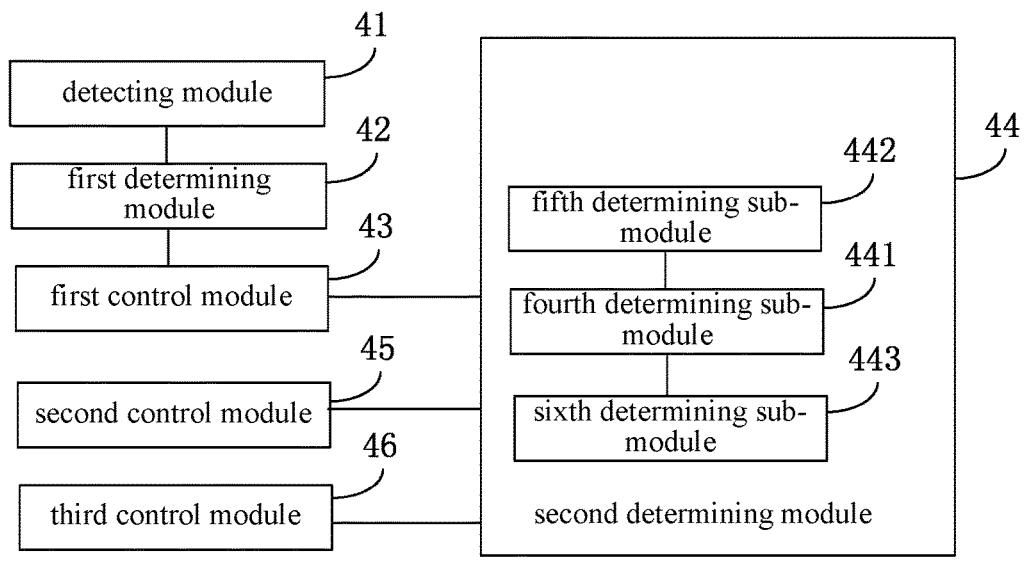
FIG. 6 is a block diagram of yet another device for controlling a state of a touch screen according to an example embodiment.

FIG. 6 is a block diagram of yet another device for controlling a state of a touch screen according to an example embodiment. As shown in FIG. 6, based on the above embodiments shown in FIG. 4 or FIG. 5, in an embodiment, the device may further include: a second determining module 44, a second control module 45, and a third control module 46.

The second determining module 44 is configured to determine whether the induction information reaches a second set of preset thresholds, after the first control module 43 controls the touch screen to be switched to the first preset state.

The second control module 45 is configured to control the touch screen to be switched from the first preset state to a second preset state, if the second determining module 44 determines that the induction information does not reach the second set of preset thresholds.

The third control module 46 is configured to control the touch screen to stay in the first preset state, if the second determining module 44 determines that the induction information reaches the second set of preset thresholds.

In an embodiment, the second set of preset thresholds includes a third preset threshold and a fourth preset threshold; the induction information includes an induction area of the suspended object on the touch screen induced by the touch screen and a strength of an induction signal of the suspended object on the touch screen induced by a proximity sensor; and the second determining module 44 may include: a fourth determining sub-module 441, configured to determine whether the induction area reaches the third preset threshold and determine whether the strength of the induction signal reaches the fourth preset threshold; a fifth determining sub-module 442, configured to determine that the induction information of the proximity sensor reaches the second set of preset thresholds, if the fourth determining sub-module 441 determines that the induction area reaches the third preset threshold and/or the strength of the induction signal reaches the fourth preset threshold; and a sixth determining sub-module 443, configured to determine that the induction information of the proximity sensor does not reach the second set of preset thresholds, if the fourth determining sub-module 441 determines that the induction area does not reach the third preset threshold and the strength of the induction signal does not reach the fourth preset threshold.

In an embodiment, the first preset state is a screen-off state, and the second preset state is a screen-on state.

With respect to the devices in the above embodiments, the specific manners for performing operations for individual modules therein have been described in detail in the embodiments regarding the methods, which are not elaborated herein again.

Figure 7:
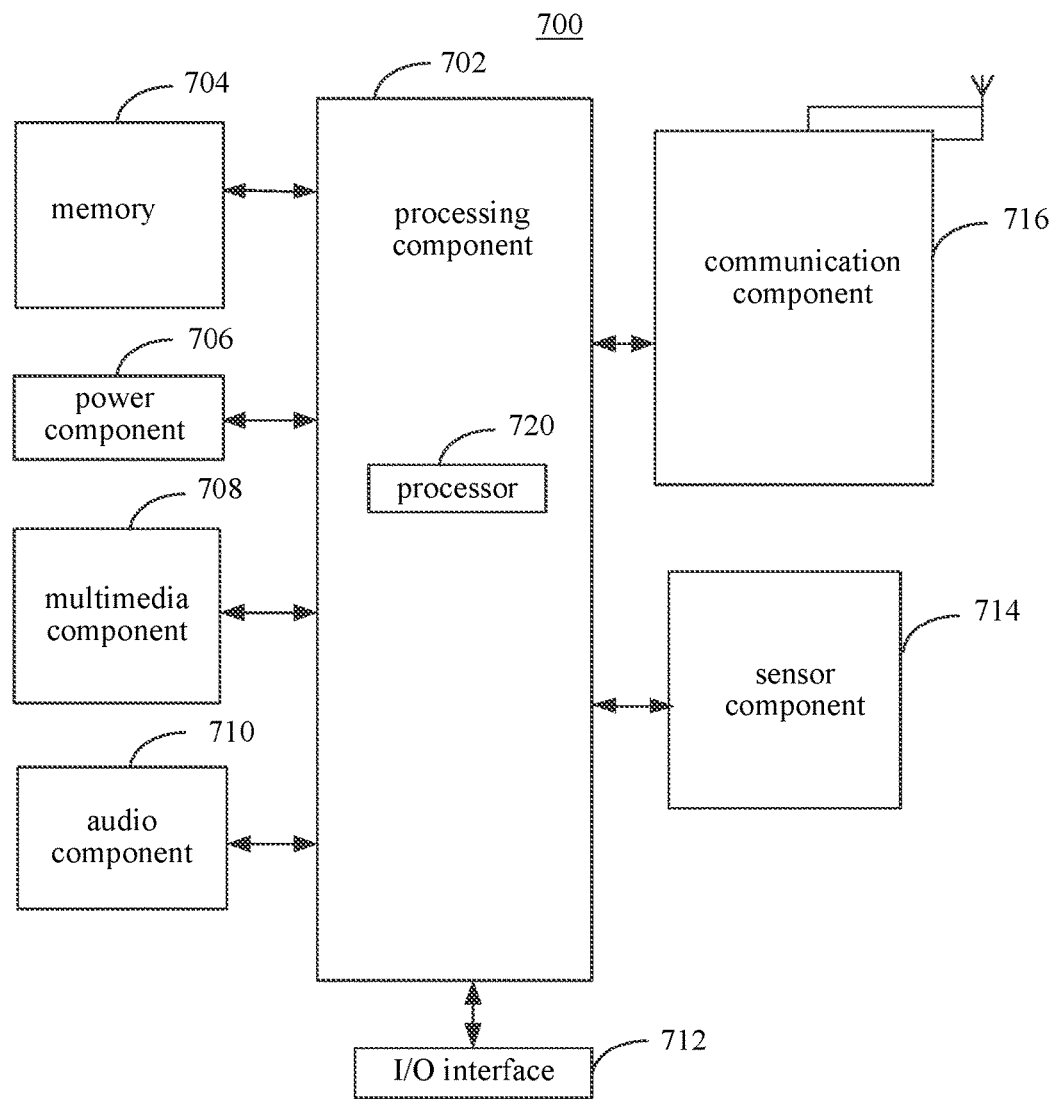
FIG. 7 is a block diagram of a device for controlling a state of a touch screen according to an example embodiment.

FIG. 7 is a block diagram of a device for controlling a state of a touch screen according to an example embodiment. For example, the device 700 may be a mobile phone, a computer, a digital broadcasting terminal, a messaging device, a game console, a tablet device, a medical equipment, a fitness equipment, a Personal Digital Assistant PDA, etc.

Referring to FIG. 7, the device 700 may include the following one or more components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 708 includes a front camera and/or a rear camera. The front camera and/or the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface for the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700 and relative positioning of components (e.g. the display and the keypad of the device 700). The sensor component 714 may also detect a change in position of the device 700 or of a component in the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WIFI, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 704 including instructions. The above instructions are executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for controlling a state of a touch screen of an electronic device, comprising:
   detecting by an operating system of the electronic device, that the touch screen is in a screen-off state or the touch screen is in a screen-on state;
   when the touch screen is in the screen-on state,
     determining whether an induction area of a suspended object on the touch screen induced by the touch screen reaches a first preset threshold and determining whether a strength of an induction signal of the suspended object on the touch screen reaches a second preset threshold;
   controlling the touch screen to be switched from the screen-on state to the screen-off state, when the induction area reaches the first preset threshold and/or the strength of the induction signal reaches the second preset threshold;
   determining whether the induction area reaches a third preset threshold and determining whether the strength of the induction signal reaches a fourth preset threshold, wherein the third preset threshold is less than the first preset threshold, and the fourth preset threshold is less than the second preset threshold; and
   controlling the touch screen to stay in the screen-off state, when the induction area reaches the third preset threshold and/or the strength of the induction signal reaches the fourth present threshold.

2. The method according to claim 1, wherein when the touch screen is in the screen-on state, the method further comprises:
controlling the touch screen to stay in the screen-on state, when the induction area does not reach the first preset threshold and the strength of the induction signal does not reach the second preset threshold.

3. The method according to claim 1, wherein when the touch screen is in the screen-off state, the method further comprising:
determining whether the induction area reaches the third preset threshold and determining whether the strength of the induction signal reaches the fourth preset threshold;
controlling the touch screen to stay in the screen-off state, when the induction area reaches the third preset threshold and/or the strength of the induction signal reaches the fourth preset threshold; and
controlling the touch screen to be switched from the screen-off state to the screen-on state, when the induction area does not reach the third preset threshold and the strength of the induction signal does not reach the fourth preset threshold.

4. An electronic device, comprising:
a processor; and
a memory, configured to store an instruction executable by the processor,
wherein the processor is configured to:
cause an operating system of the electronic device to detect that a touch screen is in a screen-off state or the touch screen is in a screen-on state;
when the touch screen is in the screen-on state,
determine whether an induction area of a suspended object on the touch screen induced by the touch screen reaches a first preset threshold and determine whether a strength of an induction signal of the suspended object on the touch screen reaches a second preset threshold;
control the touch screen to be switched from the screen-on state to the screen-off state, when the induction area reaches the first preset threshold and/or the strength of the induction signal reaches the second preset threshold;
determine whether the induction area reaches a third preset threshold and determine whether the strength of the induction signal reaches a fourth preset threshold, wherein the third preset threshold is less than the first preset threshold, and the fourth preset threshold is less than the second preset threshold;
control the touch screen to stay in the screen-off state, when the induction area reaches the third preset threshold and/or the strength of the induction signal reaches the fourth present threshold.

5. The electronic device according to claim 4, wherein when the touch screen is in the screen-on state, the processor is configured to:
control the touch screen to stay in the screen-on state, when the induction area does not reach the first preset threshold and the strength of the induction signal does not reach the second preset threshold.

6. The electronic device according to claim 4, wherein when the touch screen is in the screen-off state, the processor is further configured to:
determine whether the induction area reaches the third preset threshold and determining whether the strength of the induction signal reaches the fourth preset threshold;
control the touch screen to stay in the screen-off state, when the induction area reaches the third preset threshold and/or the strength of the induction signal reaches the fourth preset threshold; and
control the touch screen to be switched from the screen-off state to the screen-on state, when the induction area does not reach the third preset threshold and the strength of the induction signal does not reach the fourth preset threshold.

7. A non-transitory computer-readable storage medium having stored therein instructions that, when executed by a processor of a terminal device, causes the terminal device to perform a method for controlling a state of a touch screen, the method comprising:
detecting, by an operating system of the terminal device, that the touch screen is in a screen-off state or the touch screen is in a screen-on state;
when the touch screen is in the screen-on state:
determining whether an induction area of a suspended object on the touch screen induced by the touch screen reaches a first preset threshold and determining whether a strength of an induction signal of the suspended object on the touch screen reaches a second preset threshold;
controlling the touch screen to be switched from the screen-on state to the screen-off state, when the induction area reaches the first preset threshold and/or the strength of the induction signal reaches the second preset threshold;
determining whether the induction area reaches a third preset threshold and determining whether the strength of the induction signal reaches a fourth preset threshold, wherein the third preset threshold is less than the first preset threshold, and the fourth preset threshold is less than the second preset threshold;
controlling the touch screen to stay in the screen-off state, when the induction area reaches the third preset threshold and/or the strength of the induction signal reaches the fourth present threshold.

* * * * *